US005880766A

United States Patent [19]
Murakami et al.

[11] Patent Number: 5,880,766
[45] Date of Patent: Mar. 9, 1999

[54] APPARATUS FOR CORRECTING POSITIONAL DEVIATION OF LIGHT SOURCE EMITTING LIGHT BEAMS IN IMAGE RECORDING APPARATUS

[75] Inventors: Akemi Murakami; Kaoru Yasukawa; Hideo Nakayama, all of Ebina; Hideki Fukunaga, Nakai-machi; Nobuaki Ueki, Ebina; Hiromi Otoma, Ebina; Yasuji Seko, Ebina; Mario Fuse, Ebina, all of Japan

[73] Assignee: Fuji Xerox Co., Ltd., Tokyo, Japan

[21] Appl. No.: 751,674

[22] Filed: Nov. 18, 1996

[30] Foreign Application Priority Data

Jan. 17, 1996 [JP] Japan .................................. 8-006136

[51] Int. Cl.⁶ .................................................. G03G 15/04
[52] U.S. Cl. .......................... 347/236; 347/238; 347/241; 369/119; 369/121
[58] Field of Search ..................................... 347/233, 235, 347/236, 237, 238, 241, 252; 359/215, 216; 369/102, 119, 121

[56] References Cited

U.S. PATENT DOCUMENTS

| 4,590,490 | 5/1986 | Takanashi et al. ...................... 347/211 |
| 5,043,744 | 8/1991 | Fantuzzo et al. ........................ 346/108 |
| 5,442,171 | 8/1995 | Anzai ....................................... 250/235 |
| 5,627,670 | 5/1997 | Minoura et al. ......................... 359/212 |
| 5,671,077 | 9/1997 | Imakawa et al. ........................ 359/204 |
| 5,703,860 | 12/1997 | Fukunaga et al. ...................... 369/102 |

FOREIGN PATENT DOCUMENTS

| 58-100164 | 6/1983 | Japan . |
| 58-172606 | 10/1983 | Japan . |
| 61-61137 | 3/1986 | Japan . |
| 4-348334 | 12/1992 | Japan . |

*Primary Examiner*—N. Le
*Assistant Examiner*—Hai C. Pham
*Attorney, Agent, or Firm*—Oliff & Berridge, PLC

[57] ABSTRACT

An apparatus for correcting positional deviation of the light source emitting light beams in an image recording apparatus is disclosed which corrects change of the image size (dimensions of the image) on the photosensitive member due to positional deviations of beam spots on the photosensitive member on account of physical distortions caused by external vibration, temperature change, and the like. Changes in the diameter of detective light beams are measured by photodetecting portions $5_R$ and $5_L$ and piezoelectric devices $6a$ and $6b$ are driven based on the results of the detection, whereby the semiconductor laser array 1 is moved so that the multiplication b/a for the image size may be kept constant.

18 Claims, 14 Drawing Sheets

| PHOTODETECTORS | DEVIATIONS DETECTED |
|---|---|
| $5_{RA}$, $5_{LA}$ | SHIFT PARALLEL TO X-AXIS<br>ROTATION ROUND Y-AXIS |
| $5_{RC}$, $5_{LC}$ | SHIFT PARALLEL TO Z-AXIS<br>ROTATION ROUND X-AXIS |
| $5_{RD}$, $5_{LD}$ | SHIFT PARALLEL TO Z-AXIS, SHIFT PARALLEL TO X-AXIS<br>ROTATION ROUND X-AXIS, ROTATION ROUND Y-AXIS |
| $5_{RB}$, $5_{LB}$ | SHIFT PARALLEL TO Y-AXIS<br>ROTATION ROUND Z-AXIS |

APPARATUS FOR CORRECTING POSITIONAL DEVIATION OF LIGHT SOURCE EMITTING LIGHT BEAMS IN IMAGE RECORDING APPARATUS

BACKGROUND OF THE INVENTION

1. Field of the Invention

The present invention relates to an apparatus for correcting positional deviation of the light source emitting light beams in an image recording apparatus and, more particularly, to an apparatus for correcting positional deviation of the light source emitting light beams in an image recording apparatus configured to prevent occurrence of variation in dimensions of an image (hereinafter, briefly called "image size") on the photosensitive member in the main scanning direction and in the sub-scanning direction.

2. Description of the Related Art

There is an image recording apparatus which has an array of two-dimensional surface light emitting devices disposed in confrontation with a photosensitive drum through an optical system and allows the light emitting devices of the array of two-dimensional surface light emitting devices to be individually driven in accordance with an image signal, so that light beams corresponding to the image signal are emitted from the light emitting devices and the photosensitive drum rotating in the sub-scanning direction is scanned by the emitted light beams through the optical system and exposed to the same and, thereby, an electrostatic latent image is formed on the photosensitive drum. Such an image recording apparatus has come to be paid attention as the one capable of carrying out high quality and high density image recording at high speeds.

In such an image recording apparatus, need for using a polygon mirror for deflecting the light beams in the main scanning direction can be eliminated and, hence, high speed image recording can be attained. Further, by achieving high-density arrangement of the light emitting devices in the array of two-dimensional surface light emitting devices and devising a better optical system, it is expected that higher quality and higher density of the recorded image will become obtainable.

However, according to the conventional image recording apparatus, since the array of two-dimensional surface light emitting devices, optical system, photosensitive drum, and the like are fixed within a housing, when they are subjected to external vibration or temperature change, physical distortions are produced on them, whereby the positions of the beam spots produced on the photosensitive drum are deviated and the quality of the image is deteriorated. Especially when the array of two-dimensional surface light emitting devices is shifted in the direction of the optical axis or in another direction or it is tilted in a certain direction, all the light emitting devices are deviated from their right positions. Accordingly, the size of the image on the photosensitive drum in the main scanning direction and sub-scanning direction is varied and the quality of the image is deteriorated. In such a case, light emitting devices located at the extreme ends on both sides of the array of two-dimensional surface light emitting devices are greatly affected and their positional deviations put together changes the image size considerably.

SUMMARY OF THE INVENTION

Accordingly, it is an object of the invention to provide an apparatus for correcting positional deviation of the light source emitting light beams in an image recording apparatus which detects a shift of the array of two-dimensional surface light emitting devices in the direction of the optical axis and in another direction perpendicular to the direction of the optical axis and an inclination of the same in such direction (hereinafter also called "rotation") and then corrects the deviation.

It is another object of the invention to provide an apparatus for correcting positional deviation of the light source emitting light beams in an image recording apparatus which causes no variation in the image size.

In order to achieve the above mentioned objects, the present invention provides an apparatus for correcting positional deviation of the light source emitting light beams in an image recording apparatus of a type recording an image by throwing a plurality of light beams modulated in accordance with an image signal on a photosensitive member through an optical system comprising a light beam source having light emitting portions in an array form for emitting the plurality of light beams, photodetection means being disposed in the vicinity of the photosensitive member and for detecting detective light beams emitted from the light beam source thereby outputting a detection signal, image size adjustment means for adjusting the size of the image formed by the plurality of light beams thrown on the photosensitive member through the optical system, and control means for controlling the image size adjustment means in accordance with the detection signal thereby adjusting the image size to a predetermined size.

BRIEF DESCRIPTION OF THE DRAWINGS

The invention will be described with reference to the drawings, in which.

DESCRIPTION OF THE PREFERRED EMBODIMENTS

Figure 1:
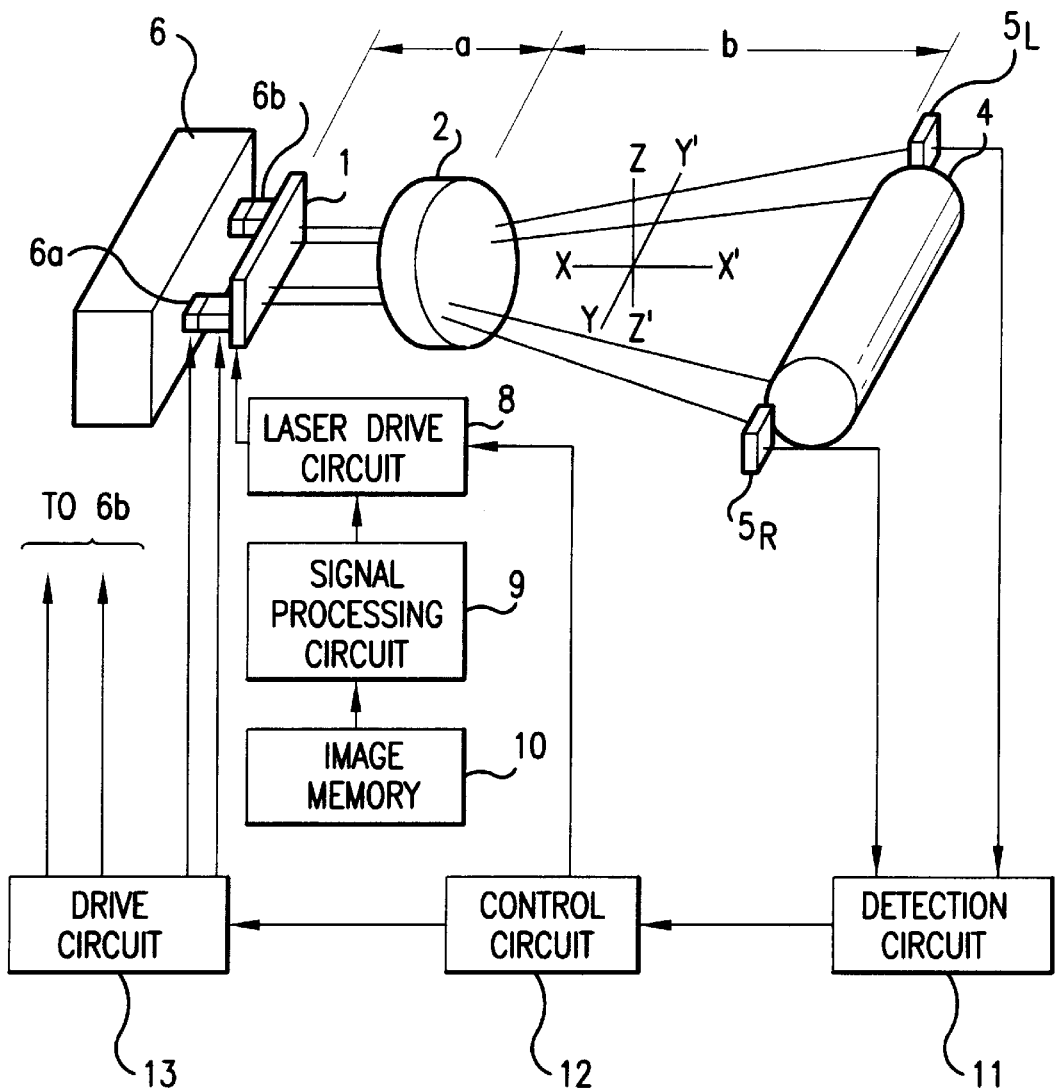
FIG. 1 is an explanatory view of an apparatus for correcting positional deviation of the light source emitting light beams in an image recording apparatus according to a first embodiment of the invention.

FIG. 1 shows an apparatus for correcting positional deviation of the light source emitting light beams in an image recording apparatus according to a first embodiment of the invention. The apparatus for correcting positional deviation of the light source emitting light beams in an image recording apparatus comprises a semiconductor laser array 1 for individually emitting a plurality of laser beams at the same time, piezoelectric devices 6a and 6b for changing the position of the semiconductor laser array 1 relative to a fixed stage 6, an image memory 10 for storing an image signal, a signal processing circuit 9 for processing the image signal and outputting a record signal corresponding to the record pattern, a laser drive circuit 8 receiving the record signal and driving the semiconductor laser array 1, an optical system 2 being placed in a position at a distance a from the semiconductor laser array 1 and for converging the emitted laser beams on predetermined positions, a photosensitive drum 4 being placed in a position at a distance b from the optical system 2 and for forming an electrostatic latent image on it by being exposed to the laser beams while rotating in the sub-scanning direction, photodetectors $5_R$ and $5_L$ being disposed at both sides of the photosensitive drum 4 and for generating detection signals corresponding to the diameters of the incident laser beams, a detection circuit 11 for detecting the spot diameters in the detection signals from the photodetectors $5_R$ and $5_L$, a control circuit 12 for outputting a control signal in accordance with data from the detection circuit 11, and a drive circuit 13 for driving the piezoelectric devices 6a and 6b on the basis of the control signal. Such components as a developer for developing the electrostatic latent image on the photosensitive drum 4 thereby forming a tonor image, a transfer device for transferring the tonor image onto a recording member, and a fixing device for fixing the tonor image on the recording member are not shown.

Figure 2:
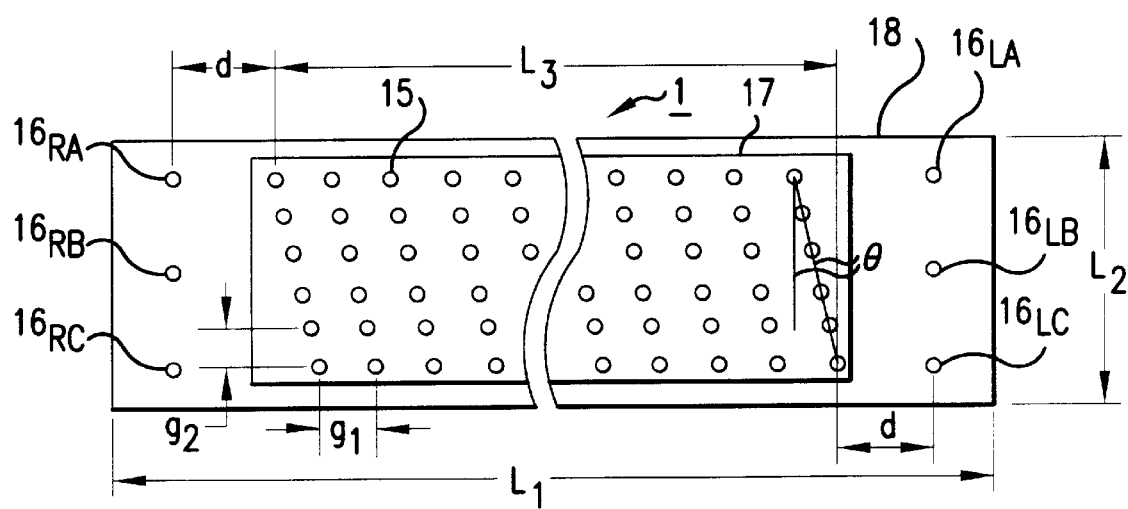
FIG. 2 is an explanatory view of a semiconductor laser array in the first embodiment.

FIG. 2 shows the semiconductor laser array 1, which is used in FIG. 1, formed of two-dimensional surface light emitting lasers. The semiconductor laser array 1 is preferably configured to have, on a single semiconductor substrate 18, region for recording 17, which have image-writing light emitting portions 15 two-dimensionally disposed therein, and regions for detection, which are positioned on the outer sides of the region for recording 17 and have detective light emitting portions 16 ($16_{RA}$, $16_{RB}$, $16_{RC}$, $16_{LA}$, $16_{LB}$, $16_{LC}$) disposed therein. In the following description, it will be presupposed that the light emitting portions 15 and 16 include lasers emitting laser beams. The image-writing light emitting portions 15 are arranged parallel to the main scanning direction and at an angle of inclination θ with the sub-scanning direction. The image-writing light emitting portions 15 have a spacing $g_1$ in the main scanning direction and a spacing $g_2$ in the sub-scanning direction and they are formed so as to have a width of $L_3$ in the main scanning direction on the semiconductor substrate 18 of a size of $L_1 \times L_2$. Meanwhile, the detective light emitting portions 16 are disposed a distance d apart from the adjoining image-writing light emitting portions 15.

Design data of the semiconductor laser array 1 shown in FIG. 2 are, for example:

$L_1$=35 mm $L_2$=2 mm $L_3$=30 mm $g_1$=$g_2$=50 μm d=3~5 mm the number of the image-writing light emitting portions 15 for each line: 16 to 32 the aperture diameter of the light emitting portions 15 and 16: 5 μm.

The piezoelectric devices 6a and 6b shown in FIG. 1 are disposed on the same horizontal line on the rear side of the semiconductor laser array 1 for shifting the semiconductor laser array 1 in the direction of the optical axis (the direction X–X'). However, when the piezoelectric devices 6a and 6b are given different drive amounts, they can rotate the semiconductor laser array 1 round Z-axis. Further, as will become apparent from the following description, if the piezoelectric device 6a and 6b are disposed on the right-hand side or the left-hand side of the semiconductor laser array 1, they can shift the semiconductor laser array 1 in the direction Y–Y'. Further, if the piezoelectric devices 6a and 6b are disposed on the upper side or the under side of the semiconductor laser array 1, they can shift the semiconductor laser array 1 in the direction Z–Z', and when they are given different drive amounts, they can rotate the semiconductor laser array 1 round X-axis. Further, if the piezoelectric devices 6a and 6b are disposed on the same vertical line on the rear side of the semiconductor laser array 1, they can shift the semiconductor laser array 1 in the direction of the optical axis (the direction X–X') and when they are given different drive amounts, they can rotate the semiconductor laser array 1 round Y-axis. The manners of setting the piezoelectric devices 6a and 6b are not limited to those described above but various other manners can be considered. Types of the piezoelectric devices 6a and 6b used are as shown in the following Table 1.

TABLE 1

| | Type A | Type B | Type C | Type D |
|---|---|---|---|---|
| Number of Laminated Elements | 360 | 200 | 200 | 150 |
| Thickness of One Element (mm) | 0.29 | 0.29 | 0.18 | 0.11 |
| Total Length (mm) | 109 | 64 | 41 | 21 |
| Length of Laminated Element (mm) | 105 | 60 | 37 | 17 |
| Long Side of Rectangle (mm) | 8.0 | 5.2 | 5.2 | 5.2 |
| Short Side of Rectangle (mm) | 8.0 | 4.5 | 4.5 | 4.5 |
| Electrostatic Capacitance (nF) | 2350 | 500 | 600 | 900 |
| Max. Rated Drive Voltage (V) | 300 | 300 | 250 | 150 |
| Rated Displacement (μm) | 98 | 57 | 42 | 20 |
| Displacement per Driving Voltage (μm/V) | 0.32 | 0.18 | 0.16 | 0.13 |
| Generated Force (N) | 4000 | 1300 | 1200 | 700 |

While there are shown the detective light emitting portions 16 ($16_{RA}$, $16_{RB}$, $16_{RC}$, $16_{LA}$, $16_{LB}$, and $16_{LC}$) in FIG. 2, as will be made apparent in the following description, six detective light emitting portions are not necessarily required.

Figures 3A, 3B:
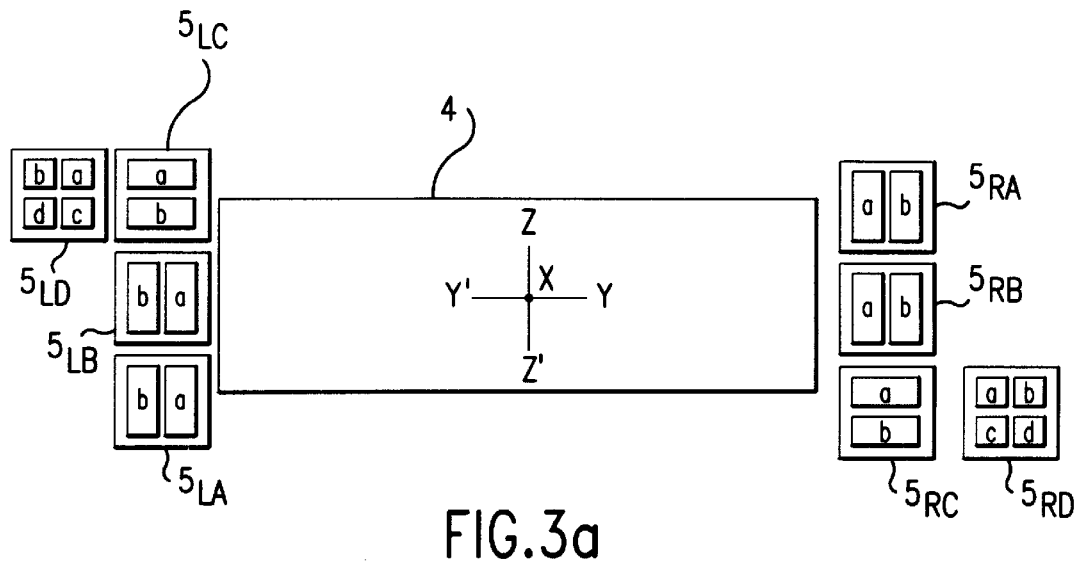
FIGS. 3a and 3b are an explanatory view of arrangement and structure of photodetectors in the first embodiment and deviations of the light source to be detected.

FIG. 3(a) shows the photodetectors $5_R$ ($5_{RA}$, $5_{RB}$, and $5_{RC}$) and $5_L$ ($5_{LA}$, $5_{LB}$, and $5_{LC}$) disposed at the points, on both sides of the photosensitive drum 4, on which beams from the detective light emitting portions 16 converge when the detective light emitting portions are in their right positions. Combination of $5_{RA}$ and $5_{LA}$, combination of $5_{RB}$ and $5_{LB}$, combination of $5_{RC}$ and $5_{LC}$, or combination of $5_{RD}$ and $5_{LD}$, combination of these four pieces, or the like is chosen depending on the purpose of the detection. Each of the photodetectors $5_R$ and $5_L$ has photodetector devices a and b, or a, b, c, and d.

FIG. 3(b) shows combinations of each of the photodetectors $5_R$ and $5_L$ and the kinds of deviations of the semiconductor laser array 1 to be detected by them.

Operations of a first embodiment of the apparatus for correcting positional deviation of the light source emitting light beams in an image recording apparatus will be described below.

An image signal read from the image memory 10 storing the image signal is processed in the signal processing circuit 9 in accordance with the record pattern and is input as a record signal to the laser drive circuit 8. The image-writing light emitting portions 15 in the region for recording 17 of the semiconductor laser array 1 are individually subjected to intensity modulation or pulse modulation executed by the laser drive circuit 8 and emit a plurality of laser beams carrying the image information. The laser beams are converged on the photosensitive drum 4 rotating at a predetermined speed by the optical system 2, which executes enlargement, contraction, or equimultiplication to bring the width $L_3$ of the region for recording 17 of the semiconductor laser array 1 equal to the width of the region for image writing on the photosensitive drum 4, and, thereby, an electrostatic latent image is formed in the region for image writing of the photosensitive drum 4.

Parallel to the above described operations, a drive signal in accordance with a signal from the control circuit 12 is input to the laser drive circuit 8, whereby the detective light emitting portions 16 are individually driven by the laser drive circuit 8. The laser beams emitted from the detective light emitting portions 16 are passed through the optical system 2 and thrown on the photodetectors $5_R$ and $5_L$ as beam spots. When the beam spots are formed on the photodetectors $5_R$ and $5_L$, each of the photodetectors $5_R$ and $5_L$ sends the detection signal corresponding to the diameter of the spot to the detection circuit 11. The detection circuit 11 detects the diameter of the spot and outputs the data of the diameter of the spot to the control circuit 12. In the case where the spot size is beyond a predetermined range, the control circuit 12 sends a drive signal based on the data to the drive circuit 13, and the drive circuit 13, in turn, operates the piezoelectric devices 6a and 6b so that the semiconductor laser array 1 is controlled for its position and attitude. Thus, the image size is brought to a predetermined value.

The image size in the main scanning direction is determined by the value b/a based on the above described distances a and b.

The above described operations will be described in more detail for each of the cases shown in FIG. 3(b) referring to FIG. 4 to FIG. 12. Parts in FIG. 4 to FIG. 12 corresponding to those shown in FIG. 1 to FIG. 3 are denoted by corresponding reference numerals.

Figure 4A:
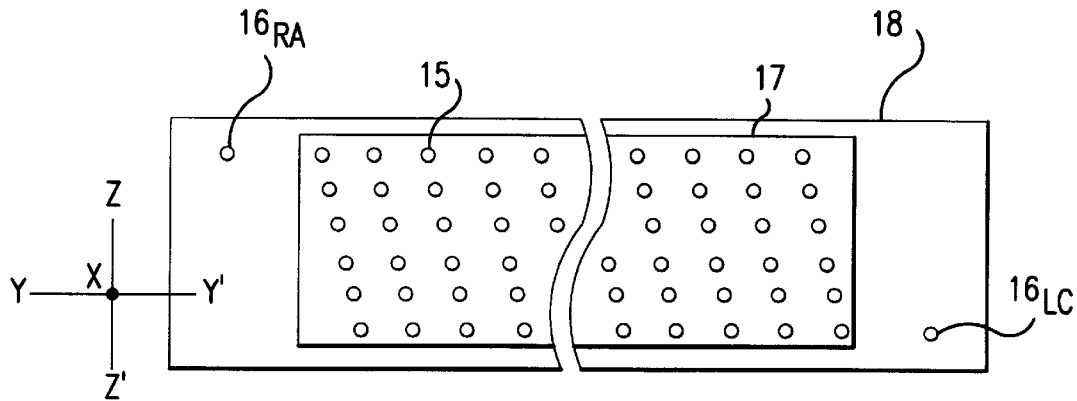
FIGS. 4a and 4b are an explanatory view of arrangement of the light source and arrangement of the photodetectors in the vicinity of the photosensitive member in the first embodiment.
Figure 4B:
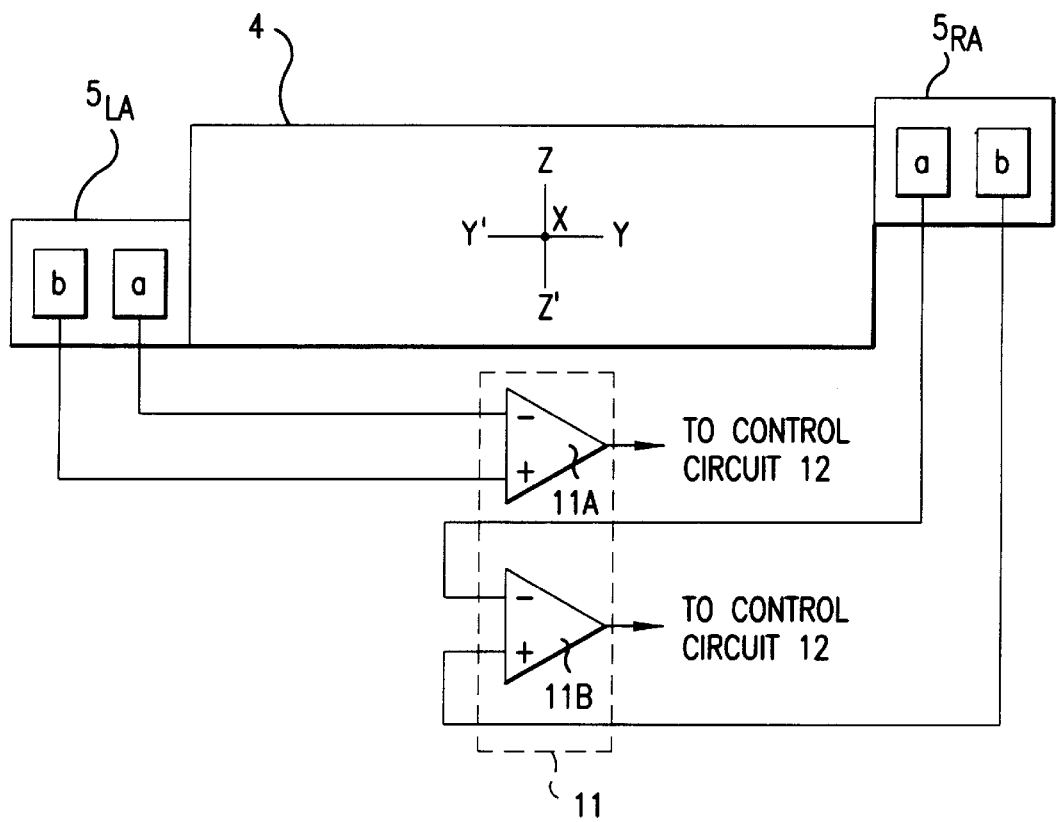

FIGS. 4(a) and 4(b) show a first case, where the detective light emitting portions $16_{RA}$ and $16_{LA}$ of the semiconductor laser array 1 are driven and the emitted laser beams are detected by the photodetectors $5_{RA}$ and $5_{LA}$ each having the photodetector devices a and b. Detection signals from the photodetectors $5_{RA}$ and $5_{LA}$ are input to differential amplifiers 11A and 11B of the detector circuit 11 whereby the state of the photodetection is detected. The differential signals of the detection circuit 11 are supplied to the control circuit 12, which, in turn, controls the piezoelectric devices 6a and 6b through the drive circuit 13. The piezoelectric device 6a is driven based on the detection signal from the photodetector $5_{RA}$ and the piezoelectric device 6b is driven based on the detection signal from the photodetector $5_{LA}$. Thus, a variation in the image size due to a shift of the semiconductor laser array 1 parallel to the optical axis (in the direction of X-axis) and a variation in the image size due to an inclination in the tilting direction of the same with respect to the optical axis (rotation round Y-axis) can be corrected.

Figure 5A:
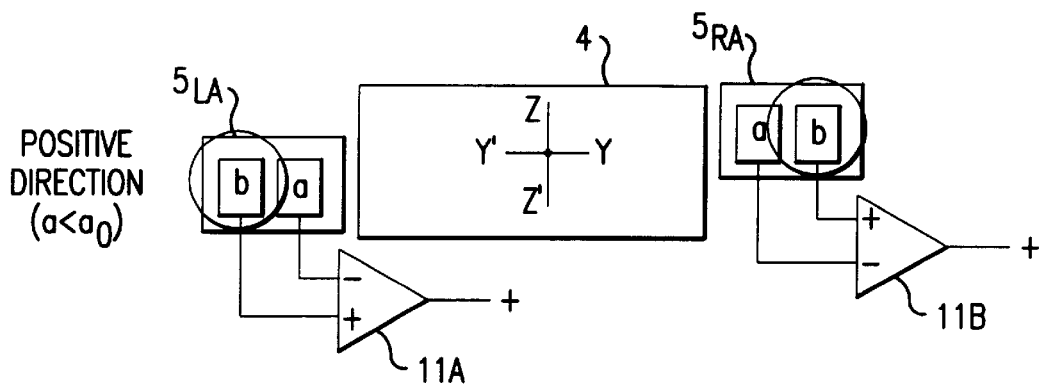
FIGS. 5a, 5b and 5c are an explanatory view of states of spots incident on the photodetectors in the first embodiment.
Figure 5B:
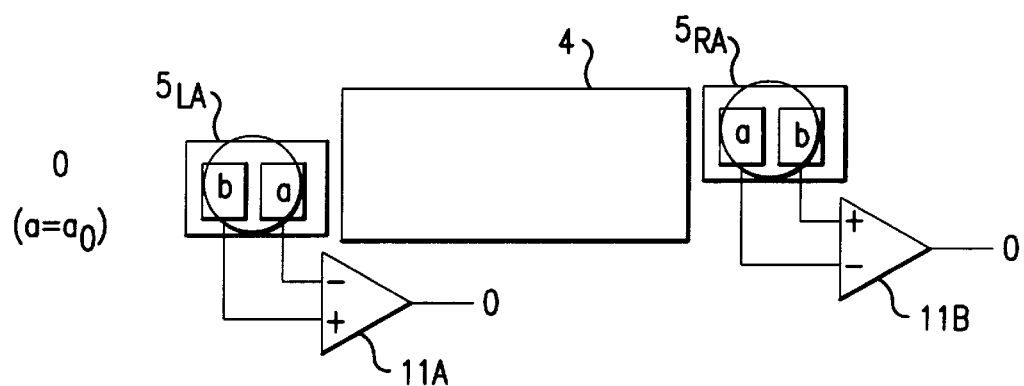
Figure 5C:
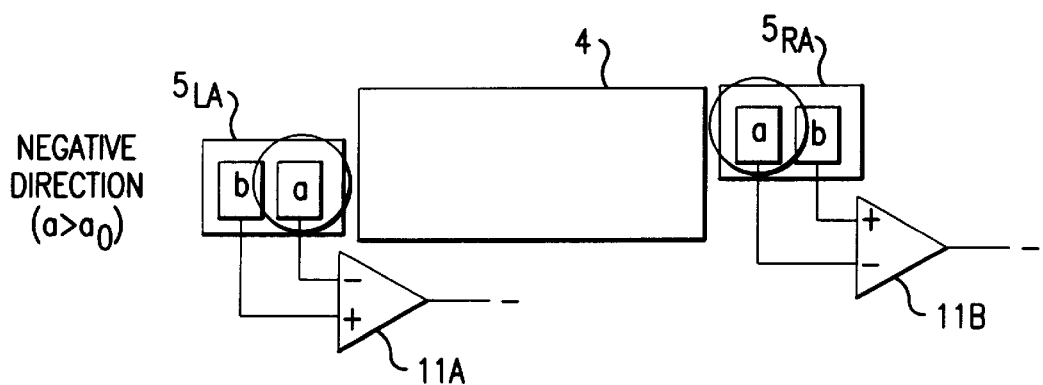

FIGS. 5(a) to (c) show states of the laser beams incident on the photodetectors $5_{RA}$ and $5_{LA}$ shown in FIG. 4. Referring to FIG. 5(b), when there is no parallel deviation and the distance a is equal to the set value $a_0$ ($a=a_0$), outputs of the differential amplifiers 11A and 11B are zero. On the other hand, referring to FIG. 5(a), when the distance a is shifted in the direction X' ($a<a_0$), the multiplication b/a becomes greater and, hence, the image size, the above described dimensions of the image, increases. Projected spots from the detective light emitting portions $16_{RA}$ and $16_{LA}$ are brought incident on the photodetectors $5_{RA}$ and $5_{LA}$ as spots shifting away from the photosensitive drum 4 leftward and rightward and, in addition, becoming larger in diameter. As a result, plus (+) error signals are detected by both of the two differential amplifiers 11A and 11B. The control circuit 12, upon receipt of the + error signals, causes the semiconductor laser array 1 to shift in the direction X by means of the piezoelectric devices 6a and 6b so that the error signals may become zero. Referring to FIG. 5(c), when the distance a shifts in the direction X ($a>a_0$), since the multiplication b/a becomes smaller, the dimensions of the image decrease. Projected spots from the detective light emitting portions $16_{RA}$ and $16_{LA}$ are brought incident on the photodetectors $5_{RA}$ and $5_{LA}$ as spots shifting in the directions toward the photosensitive drum 4 and, in addition, becoming larger in diameter. As a result, minus (−) error signals are detected by the two differential amplifiers 11A and 11B. The control circuit 12, upon receipt of the− error signals, causes the semiconductor laser array 1 to shift in the direction X' by means of the piezoelectric devices 6a and 6b so that the error signals may become zero.

Figure 6A:
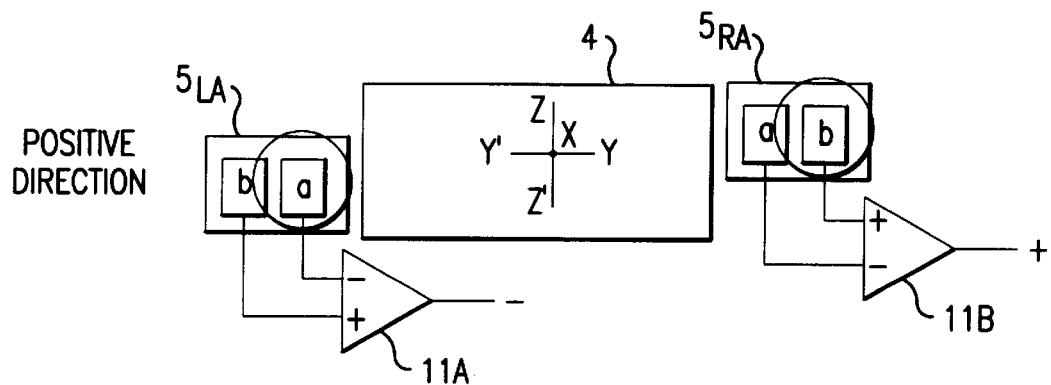
FIGS. 6a, 6b and 6c are is an explanatory view of states of spots incident on the photodetectors in the first embodiment.
Figure 6B:
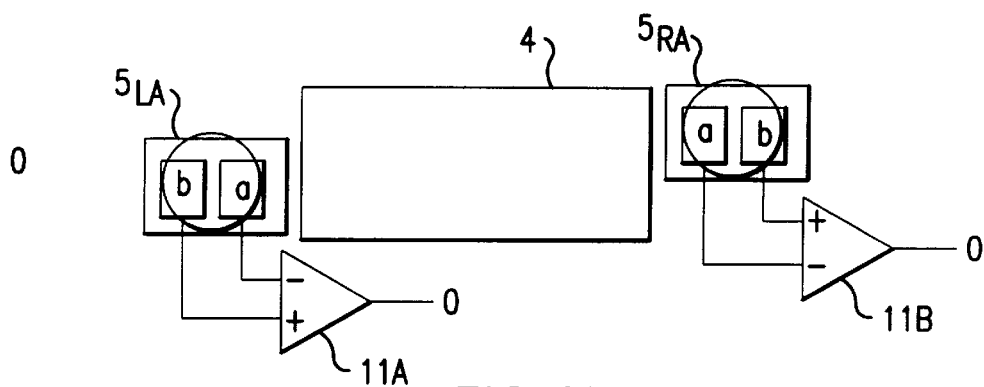
Figure 6C:
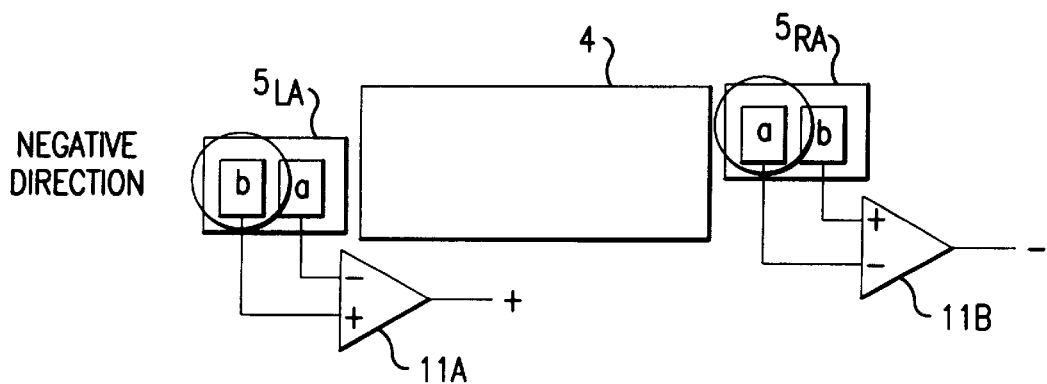

FIGS. 6(a) to (c) show states of spots incident on the photodetectors $5_{RA}$ and $5_{LA}$ when the semiconductor laser array 1 has produced an inclination in the tilting direction with its center taken as the fulcrum (rotation round Y-axis). Referring to FIG. 6(b), when there is no tilt, no error signals are detected by and sent out from the differential amplifiers 11A and 11B. Referring to FIG. 6(a), when there is produced a tilt in the positive direction (rotation in which the upper portion is moved toward the optical system 2 and the lower portion is moved away from the same), the multiplication b/a for the upper portion of the semiconductor laser array 1 becomes greater and, hence, the spot from the detective light emitting portion $16_{RA}$ shifts in the direction toward the photosensitive drum 4, while the multiplication b/a for the lower portion becomes smaller and, hence, the spot from the detective light emitting portion $16_{LA}$ shifts in the direction away from the photosensitive drum 4. As a result, a + signal and a− signal are detected by the differential amplifiers 11A and 11B and the control circuit 12, in response to the signals, causes the upper portion of the semiconductor laser array 1 to move in the direction X and the lower portion of the same to move in the direction X'. When a tilt is produced in the negative direction, operations converse to those described above will occur as shown in FIG. 6(c).

In the invention, it is possible to cope with not only the inclination of the semiconductor laser array 1 in its tilting direction with its center taken as the fulcrum, but also an inclination of it with its lower portion or upper portion taken as the fulcrum or an inclination with its another position taken as the fulcrum. It is because the apparatus is configured such that two drive mechanisms, i.e., the piezoelectric devices 6a and 6b, for example, provided on the semiconductor laser array 1 are individually driven in accordance with the error signals obtained from the two detectors $5_{RA}$ and $5_{LA}$, and an error signal obtained from one detector can be expressed as a combination of an error produced by an inclination in the tilting direction (rotation round Y-axis) and an error produced by a shift parallel to the optical axis. Thus, the position and attitude of the semiconductor laser array 1 are automatically controlled to be correct at all times. As a result, the spots irradiating the region for recording of the photosensitive drum 4 are constantly corrected for their positional deviations and, consequently, defocusing is also corrected.

Figure 7A:
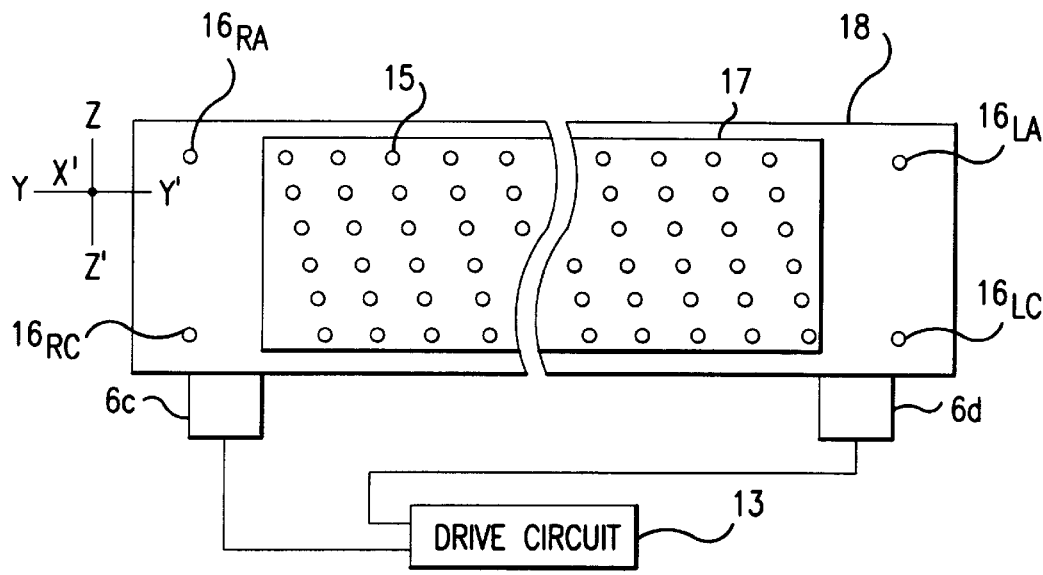
FIGS. 7a and 7b are an explanatory view of arrangement of the light source and arrangement of the photodetectors in the vicinity of the photosensitive member in the first embodiment.
Figure 7B:
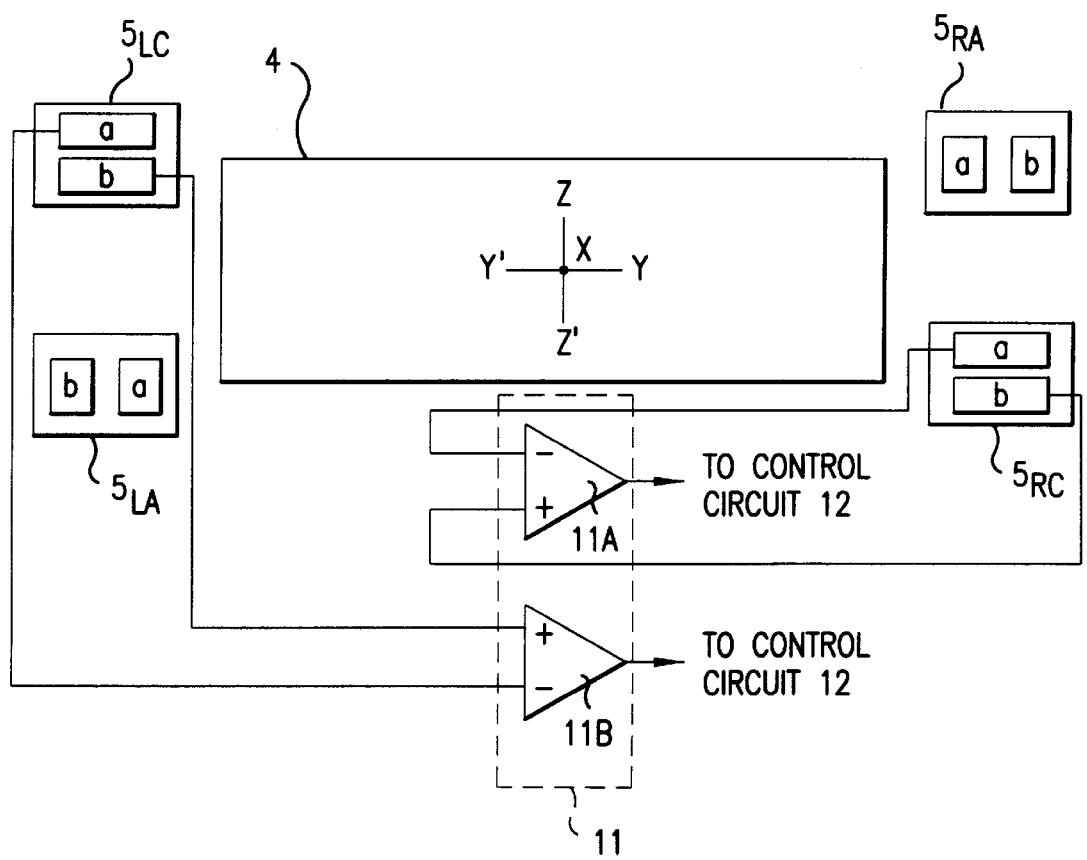

FIGS. 7(a) and (b) show a second case, where, in addition to the deviation parallel to X-axis and rotation round Y-axis shown in the first case, positional deviations in a plane perpendicular to the optical axis of the semiconductor laser array 1 (a parallel deviation to Z-axis and a rotational deviation round X-axis) are corrected. The semiconductor laser array 1 is provided with four detective light emitting portions $16_{RA}$, $16_{RC}$, $16_{LA}$, and $16_{LC}$ at the four corners of the area beyond the region for writing image. On the under side of the semiconductor laser array 1, there are provided, along the main scanning direction, piezoelectric devices 6c and 6d to be driven by the drive circuit 13. Further, there are four photodetectors $5_{RA}$, $5_{RC}$, $5_{LA}$, and $5_{LC}$ disposed at the positions on which beams from the detective light emitting portions $16_{RA}$, $16_{RC}$, $16_{LA}$, and $16_{LC}$ are projected through the optical system 2. Here, the photodetectors $5_{RA}$ and $5_{LA}$ are used, as described in the first case, for detecting changes in the dimensions of the image due to a deviation parallel to X-axis and an inclination in the tilting direction (rotation round Y-axis) of the semiconductor laser array 1. The pertinent operations are the same as those described in the first case. On the other hand, the photodetectors $5_{RC}$ and $5_{LC}$ each having divisions of two photodetecting areas a and b divided in the sub-scanning direction are used for detecting a parallel deviation to Z-axis and a rotational deviation round X-axis. The positional deviation signals detected by the photodetectors $5_{RC}$ and $5_{LC}$ are turned into their respective differential signals in the detection circuit 11 and these signals are transmitted to the drive circuit 13 through the control circuit 12 to drive the piezoelectric devices 6c and 6d. The output of the photodetectors $5_{RC}$ becomes the signal source for driving the piezoelectric device 6c and the output of the photodetectors $5_{LC}$ becomes that for driving the piezoelectric device 6d. When the semiconductor laser array 1 is deviated in the direction Z', + signals are obtained from the detection circuit 11 and when it is deviated in the direction Z,– signals are obtained from the detection circuit 11. Such a configuration in which + and– are reversed may also be used. First, on the basis of the signals from the photodetectors $5_{RC}$ and $5_{LC}$, deviations in the plane perpendicular to the optical axis (parallel deviation to Z-axis and rotational deviation round X-axis) are corrected and, then, on the basis of the signals from the photodetectors $5_{RA}$ and $5_{LA}$, a positional deviation parallel to the optical axis and an inclination in the tilting direction (deviation parallel to X-axis and rotation round Y-axis) are corrected.

Figure 8A:
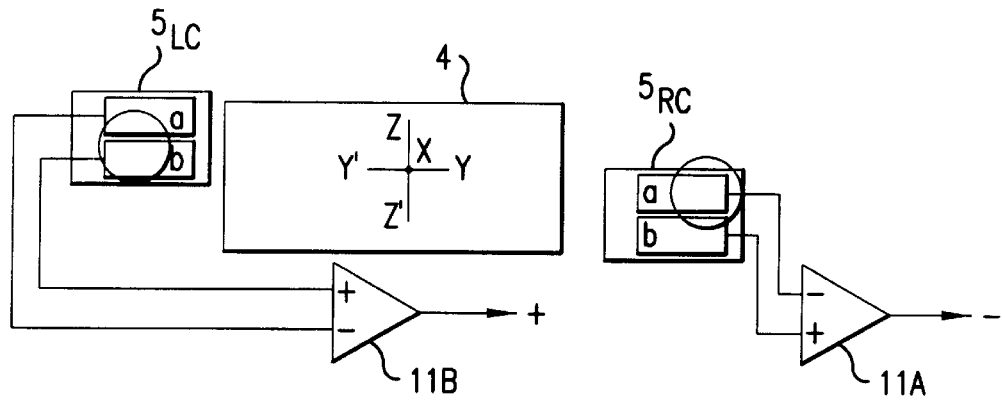
FIGS. 8a, 8b and 8c are an explanatory view of states of spots incident on the photodetectors in the first embodiment.
Figure 8B:
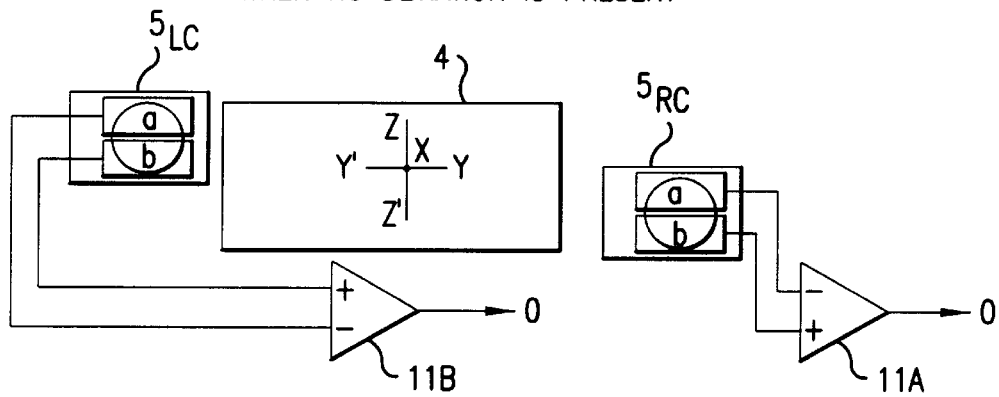
Figure 8C:
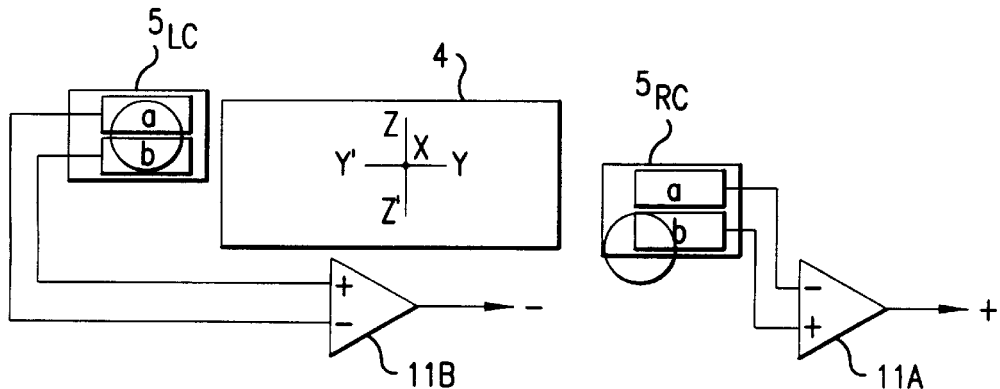

FIGS. 8(a) to (c) show the state of the spots incident on the photodetectors $5_{RC}$ and $5_{LC}$ when positional deviations are produced in a plane perpendicular to the optical axis (parallel deviation to Z-axis and rotational deviation round X-axis). FIG. 8(a) shows the case where the semiconductor laser array 1 rotates rightward, i.e., it rotates such that its Y side ascends and its Y' side descends. FIG. 8(c) shows the case where the semiconductor laser array 1 rotates leftward, i.e., it rotates such that its Y side descends and its Y' side ascends.

Figure 9A:
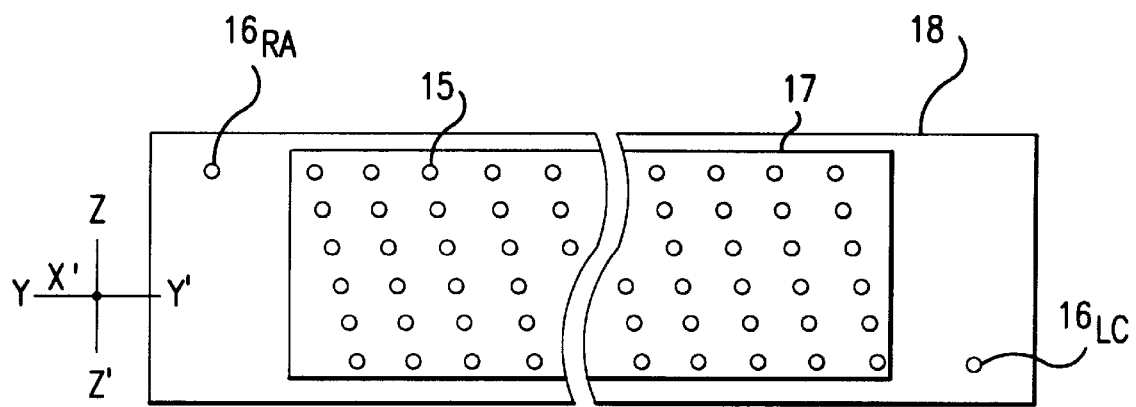
FIGS. 9a and 9b are an explanatory view of arrangement of the light source and arrangement of the photodetectors in the vicinity of the photosensitive member in the first embodiment.
Figure 9B:
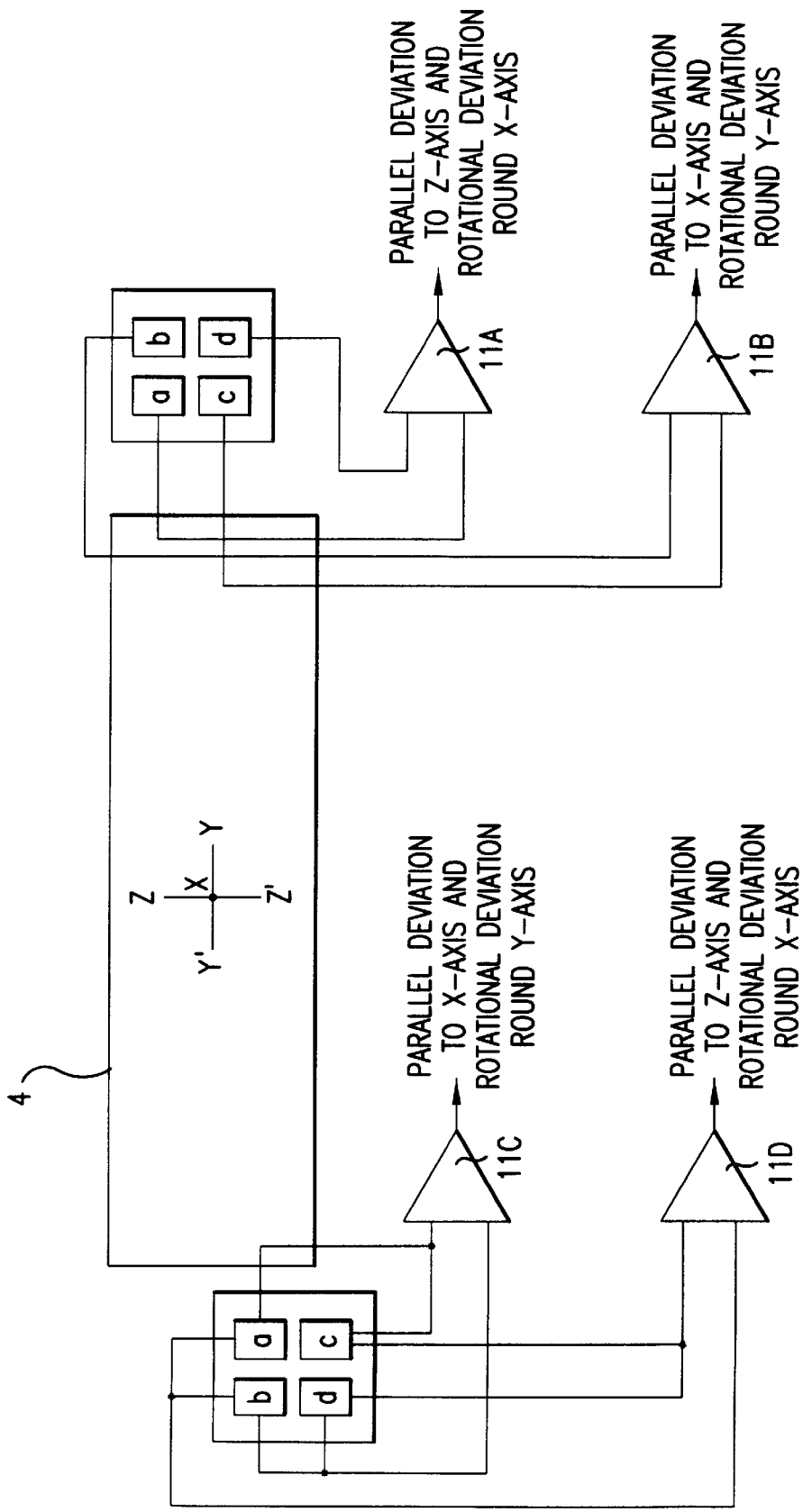

FIGS. 9(a) and (b) show a third case in which deviations in a plane perpendicular to the optical axis (parallel deviation to Z-axis and rotational deviation round X-axis) and a positional deviation parallel to the optical axis and an inclination in the tilting direction (deviation parallel to X-axis and rotation round Y-axis) are corrected. The semiconductor laser array 1 is provided with the detective light emitting portions $16_{RA}$ and $16_{LC}$ and the photosensitive drum 4 is provided at both sides thereof with the photodetectors $5_{RD}$ and $5_{LD}$ for detecting projected spots from the detective light emitting portions $16_{RA}$ and $16_{LC}$. The photodetectors $5_{RD}$ and $5_{LD}$ each have quartered photodetector devices a, b, c, and d divided both in the main scanning direction (Y-axis) and in the sub-scanning direction (Z-axis). From the quartered photodetectors $5_{RD}$ and $5_{LD}$, error signals for deviations in the plane perpendicular to the optical axis (parallel deviation to Z-axis and rotational deviation round axis-X), as well as a positional deviation parallel to the optical axis and an inclination in the tilting direction (deviation parallel to X-axis and rotation round Y-axis), are obtained. For this purpose, the photodetector devices a and d, as well as b and c, are paired and differentials of them are picked up. Otherwise, the photodetector devices a and b, as well as c and d, may be paired and differentials of them may be picked up. Thereby, the deviations in the plane perpendicular to the optical axis (parallel deviation to Z-axis and rotational deviation round axis-X), as well as the positional deviation parallel to the optical axis and the inclination in the tilting direction (deviation parallel to X-axis and rotation round Y-axis), can be respectively detected. Depending on the thus obtained results, the position and attitude of the semiconductor laser array 1 are corrected.

Figure 10A:
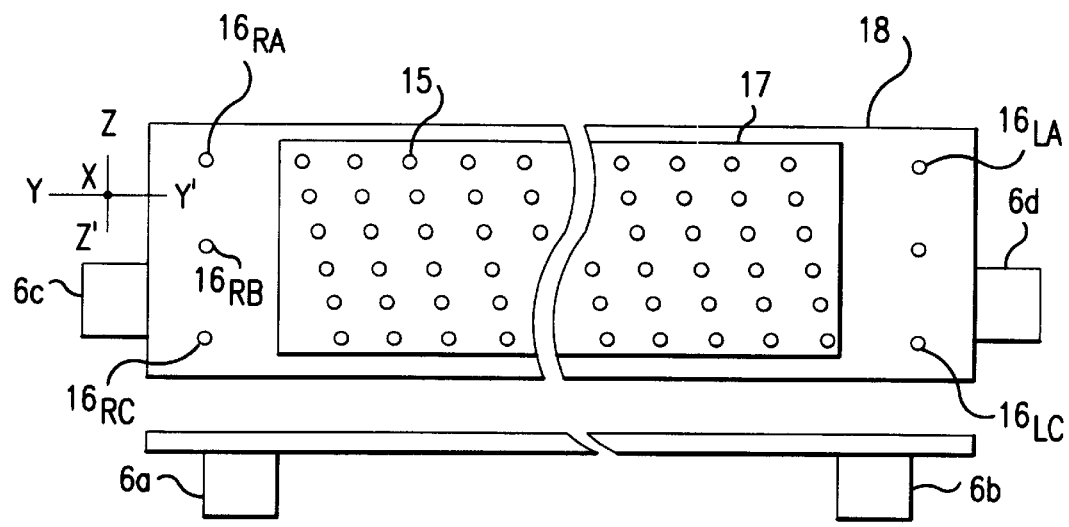
FIGS. 10a and 10b are an explanatory view of arrangement of the light source and arrangement of the photodetectors in the vicinity of the photosensitive member in the first embodiment.
Figure 10B:
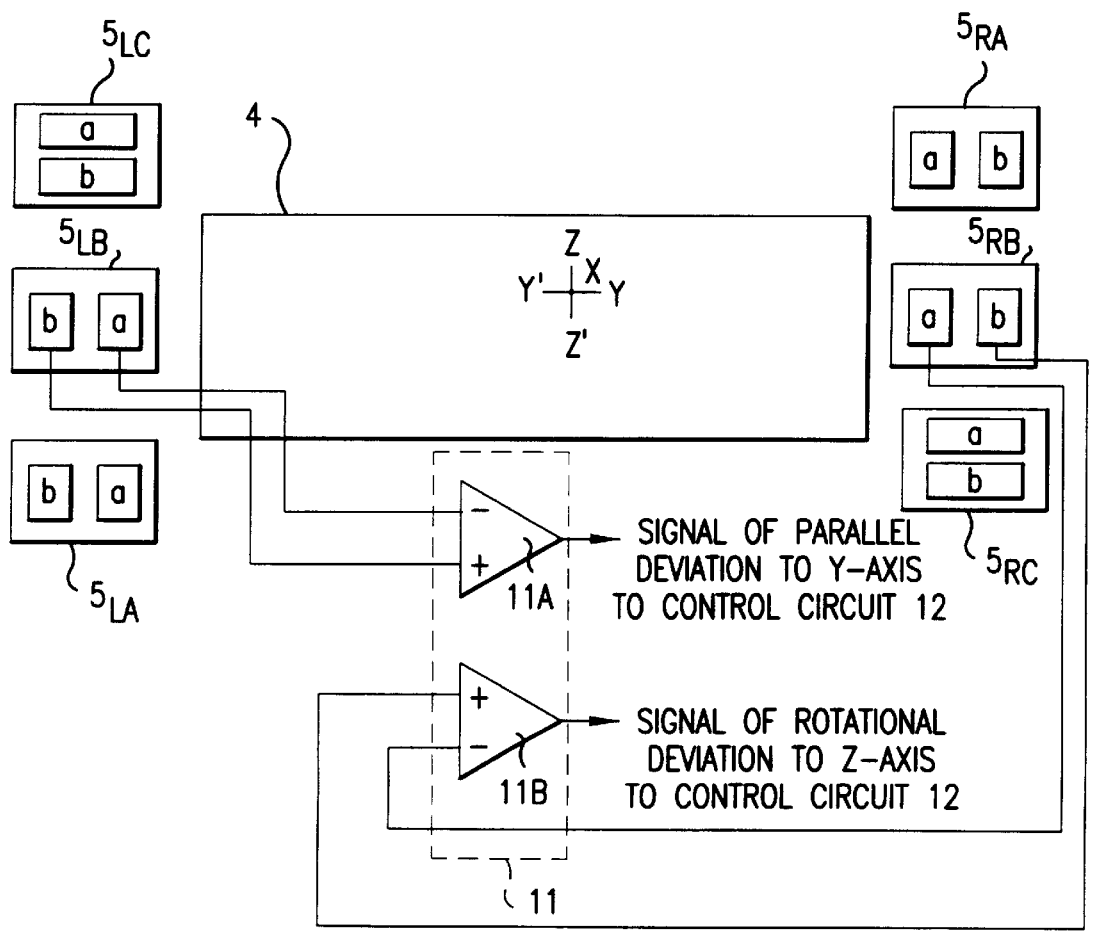

FIGS. 10(a) and (b) show a fourth case in which, in addition to those in the first to third cases, a parallel deviation to Y-axis and a rotational deviation round Z-axis can be corrected. In this case, in order to detect the shift parallel to Y-axis and the rotation round Z-axis, the semiconductor laser array 1 is provided with the detective light emitting portions $16_{RB}$ and $16_{LB}$ disposed in the middle of each region for detection aligned along the sub-scanning direction. Close to the photosensitive drum 4, there are provided the photodetectors $5_{RB}$ and $5_{LB}$ at the positions where the spots from the detective light emitting portions $16_{RB}$ and $16_{LB}$ are detected. The photodetectors $5_{RB}$ and $5_{LB}$ each have halved photodetector devices a and b divided in the main scanning direction. Further, the semiconductor laser array 1 is provided with the piezoelectric devices 6c and 6d on the left and right sides thereof for shifting parallel to Y-axis and the piezoelectric devices 6a and 6b on the rear side thereof for rotating round Z-axis. Correction of the parallel deviation to X-axis, the rotational deviation round Y-axis, the parallel deviation to Z-axis, and the rotational deviation round X-axis are made by using the spots incident on the photodetectors $5_{RA}$ and $5_{LA}$ as described in the second case. For the deviation parallel to Y-axis, the differentials between the outputs of the halved photodetector devices a and b of each of the photodetectors $5_{RB}$ and $5_{LB}$ are taken and the piezoelectric devices 6c and 6d are driven so that the differentials may become 0. For the deviation parallel to Y-axis, signals are taken from the photodetectors $5_{RB}$ and $5_{LB}$ and the piezoelectric devices 6c and 6d are driven in accordance with the error signals obtained from each of the photodetectors. As a matter of course, correction by using only one of them may meet the purpose. For the rotational deviation round Z-axis, diameters of the spots incident on the photodetectors $5_{RB}$ and $5_{LB}$ are compared and the piezoelectric devices 6c and 6d are driven so that both the diameters may become equal. In this case, it will be better first to correct the rotational deviation round Z-axis through comparison of the spot diameters at both ends and then to correct the parallel deviation to Y-axis.

Figure 11A:
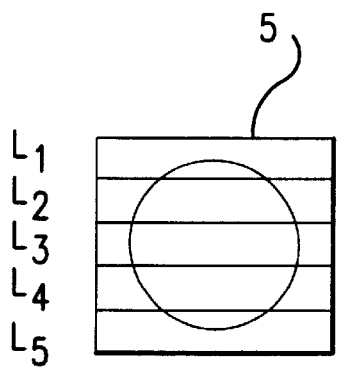
FIGS. 11a and 11b are an explanatory view of the form of a photodetecting device in the first embodiment.
Figure 11B:
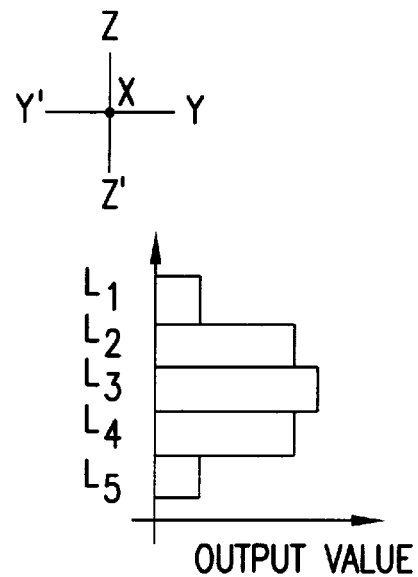

FIGS. 11(a) and (b) show a photodetector 5 for effectively achieving comparison of spot diameters. The photodetector 5 has photodetector devices $1_1$–$1_5$ in a slip form as shown in FIG. 11(a) and detects the diameter of the spot on the basis of output values of the photodetector devices $1_1$–$1_5$ as shown in FIG. 11(b).

Figure 12A:
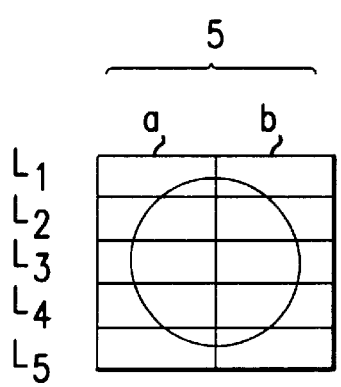
FIGS. 12a and 12b are an explanatory view of the form of photodetecting devices in the first embodiment.
Figure 12B:
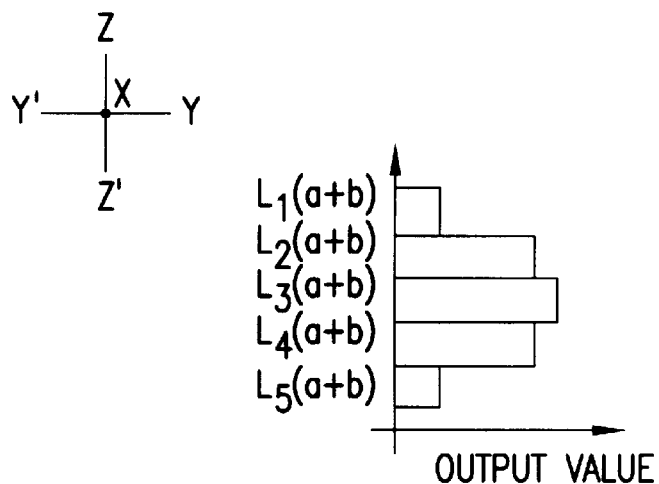

FIGS. 12(a) and (b) show another photodetector 5 for effectively achieving comparison of spot diameters and correcting a deviation parallel to Y-axis. The photodetector 5 has photodetector devices $1_1$–$1_5$ each of which is divided into a and b as shown in FIG. 12(a) and detects the diameter of the spot on the basis of output values $1_1 \cdot (a+b)$ to $1_5 \cdot (a+b)$ as shown in FIG. 12(b). Then, it detects the deviation parallel to Y-axis by calculating $(1_2+1_3+1_4) \cdot a - (1_2+1_3+1_4) \cdot b$ on the basis of the output values from the photodetector devices.

Figure 13:
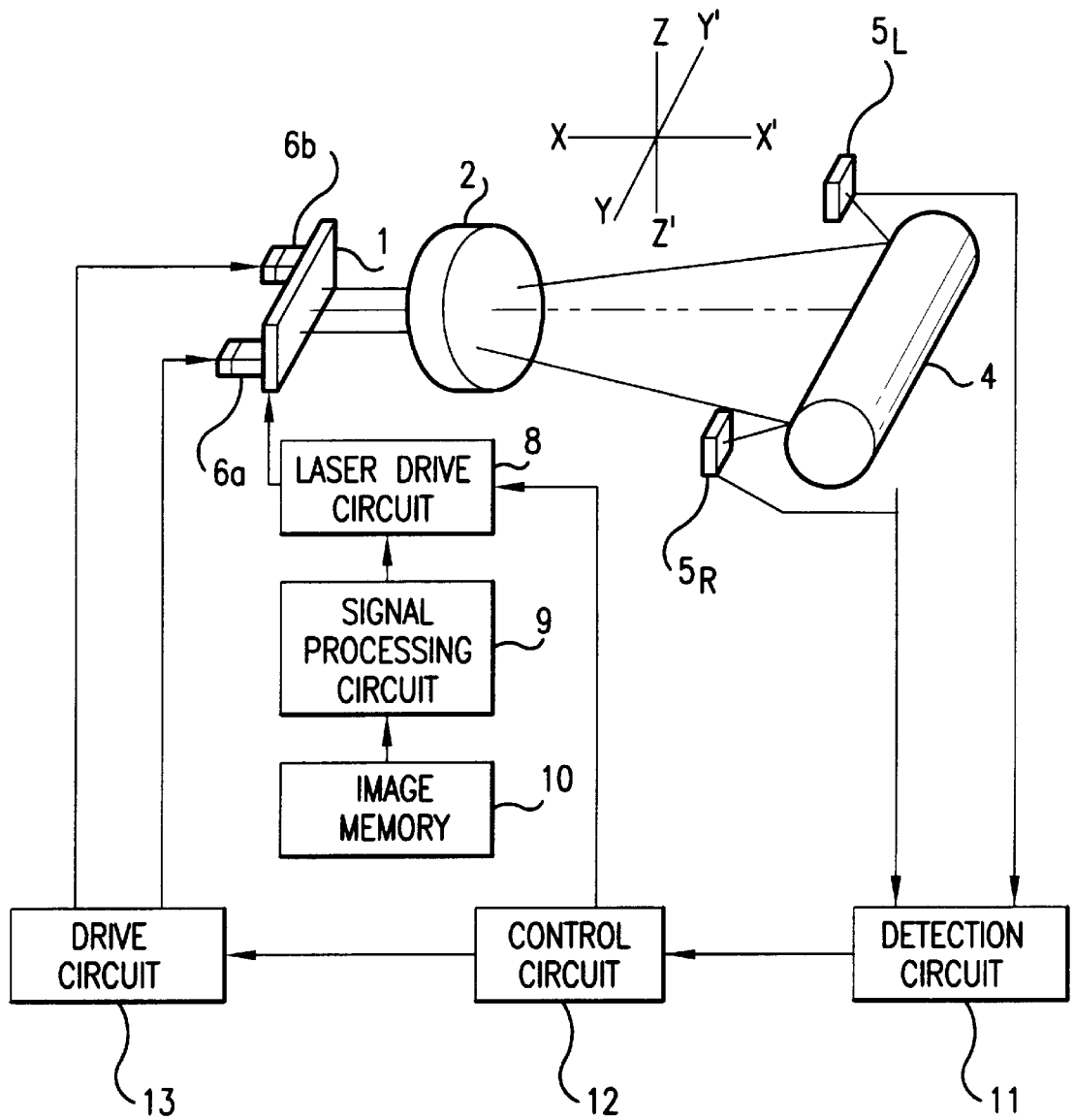
FIG. 13 is an explanatory view of an apparatus for correcting positional deviation of the light source emitting light beams in an image recording apparatus according to a second embodiment of the invention.

FIG. 13 shows an apparatus for correcting positional deviation of the light source emitting light beams in an image recording apparatus according to a second embodiment of the invention. Since parts corresponding to those in the first embodiment are denoted by corresponding reference numerals, duplicate description of the same will be omitted.

In this embodiment, the semiconductor laser array 1 is not provided with the detective light emitting portion but it is configured such that the light beams for image recording thrown onto the photosensitive drum 4 are reflected from the photosensitive drum 4 and the reflected light beams are detected by the photodetectors $5_R$ and $5_L$. The photodetectors $5_R$ and $5_L$ can be constituted of the photodetectors $5_{RA}$–$5_{RD}$ and $5_{LA}$–$5_{LD}$ used in the first to fourth cases of the first embodiment. The reflected light beams that are detected by the photodetectors $5_R$ and $5_L$ are the reflected beams of the light beams emitted from the portions at the leftmost and rightmost sides of the recording light emitting portion of the semiconductor laser array 1. Through such arrangement, interference with the other light beams can be prevented and highly effective detection can be achieved.

Figure 14A:
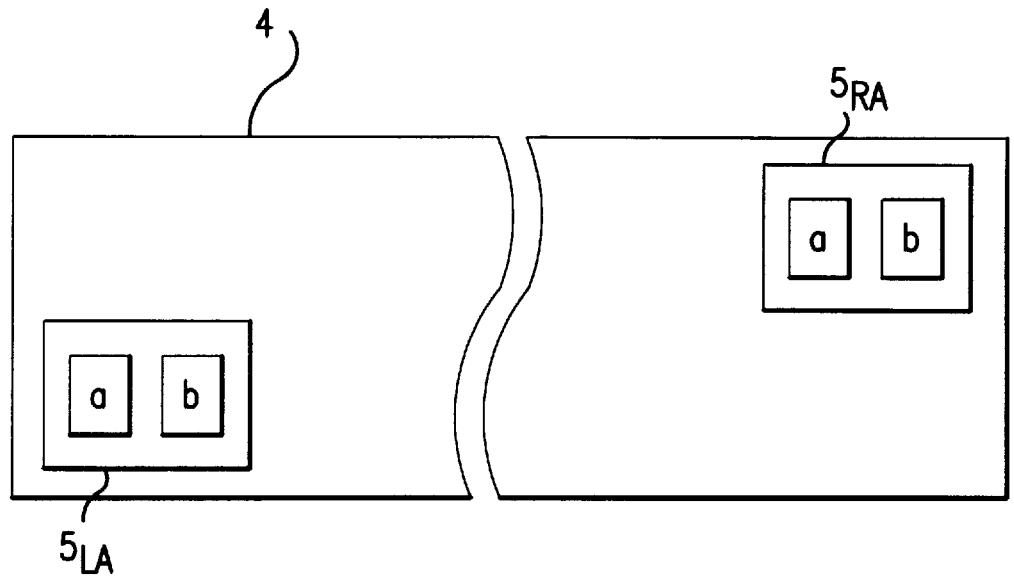
FIGS. 14a and 14b are an explanatory view of an apparatus for correcting positional deviation according to a third embodiment of the invention.

FIG. 14(a) shows an apparatus for correcting positional deviation of the light source emitting light beams in an image recording apparatus according a third embodiment of the invention, in which the photodetectors $5_{RA}$ and $5_{LA}$ are disposed on the photosensitive drum 4. In this case, the photodetectors $5_{RA}$ and $5_{LA}$ may be embedded in the photosensitive drum 4 integrally formed therewith and having its photodetecting surface exposed in the surface of the photosensitive drum 4. Instead of being embedded, it may, otherwise, be disposed on the photosensitive drum 4 kept apart from the surface of the photosensitive drum 4 by a predetermined space. In the latter case, highly accurate detection can be achieved by making positioning markings on the photosensitive drum 4 and disposing the photodetectors $5_{RA}$ and $5_{LA}$ so as to register with the markings.

Figure 14B:
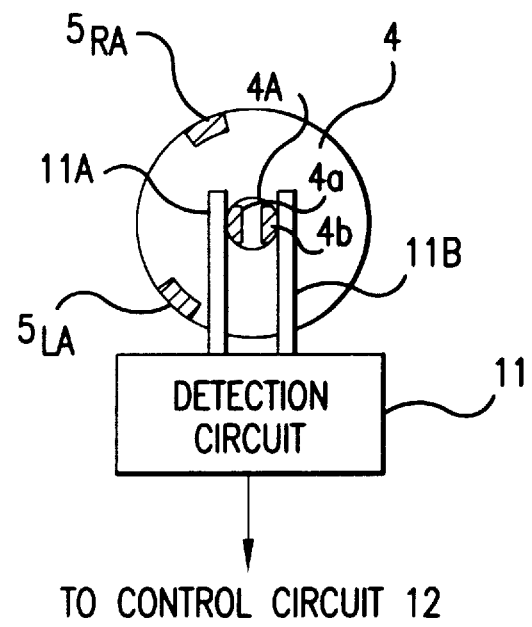

FIG. 14(b) shows a state of the photodetectors $5_{RA}$ and $5_{LA}$ embedded in the photosensitive drum 4. The detection signals from the photodetectors $5_{RA}$ and $5_{LA}$ are output to the signal output portion 4a and 4b provided on the rotatable shaft 4A of the photosensitive drum 4 and supplied to the detection circuit 11 through contact leads 11A and 11B. The manner of supplying the detection signal to the detection circuit 11 is not limited to that described above but may be carried out through a non-contact coupling system employing such a method as electromagnetic coupling, electrostatic coupling, or optical coupling.

As described above, according to the apparatus for correcting positional deviation of the light source emitting light beams in an image recording apparatus of the invention, it is adapted such that, even if positional deviations of spots of light beams are produced on the photosensitive member by physical distortions occurring therein due to external vibration, temperature change, and the like, the change in the spot size on account of such positional deviations is detected in the vicinity of the photosensitive member and, thereby, the position and attitude of the light source is corrected. Hence, it has been made possible to have the light beams thrown on predetermined positions of the photosensitive drum at all times. As a result, the image size on the photosensitive drum can be constantly kept at a predetermined value. The present invention can be used for adjustments of the light source while the apparatus is fabricated and also for correction of positional deviations of the light source before and during the operation of the apparatus. Further, since the invention has made six-axial adjustments of the light source possible, any type of deviation produced on the light source can be coped with.

What is claimed is:

1. In an image recording apparatus an image by throwing a plurality of light beams modulated in accordance with an image signal on a photosensitive member through an optical system, an apparatus for correcting positional deviation of a light source emitting the light beams comprising:

a light beam source having light emitting portions in an array form for emitting said plurality of light beams;

photodetection means being disposed on or in a vicinity of the photosensitive member and for detecting detective light beams emitted from said light beam source thereby outputting a detection signal;

image size adjustment means for adjusting a size of the image formed by said plurality of light beams thrown on said photosensitive member through said optical system, the image size adjustment means including distance adjustment means for adjusting a distance between said light beam source and said optical system, the distance adjustment means including displacement means for shifting said light beam source in a direction of X-axis, Y-axis, and Z-axis where the optical axis is taken along X-axis of a three-dimensional coordinate system and for rotating said light beam source around at least one axis of said three-dimensional coordinate system or an axis parallel thereto; and control means for controlling said image size adjustment means in accordance with said detection signal thereby adjusting the image size to a predetermined size.

2. An apparatus for correcting positional deviation of the light source emitting light beams in an image recording apparatus according to claim 1, wherein said distance adjustment means comprises displacement means for shifting said light beam source in a direction of X-axis where an optical axis is taken along X-axis of a three-dimensional coordinate system.

3. An apparatus for correcting positional deviation of the light source emitting light beams in an image recording apparatus according to claim 2, wherein said displacement means is formed of such an electric displacement mechanism as a piezoelectric device, a motor, and a magnetic solenoid.

4. An apparatus for correcting positional deviation of the light source emitting light beams in an image recording apparatus according to claim 1, wherein said distance adjustment means comprises displacement means for shifting said light beam source in a direction of at least one axis of X-axis, Y-axis, and Z-axis where the optical axis is taken along X-axis of a three-dimensional coordinate system.

5. An apparatus for correcting positional deviation of the light source emitting light beams in an image recording apparatus according to claim 1, wherein said light beam source includes a light emitting portion in an array form for emitting said plurality of light beams and detective light emitting portions being disposed in regions at both sides in a main scanning direction of said light emitting portion in an array form and for emitting said detective light beams.

6. An apparatus for correcting positional deviation of the light source emitting light beams in an image recording apparatus according to claim 5, wherein said detective light emitting portions include a plurality of light emitting portions disposed in a sub-scanning direction in said regions at both sides in the main scanning direction.

7. An apparatus for correcting positional deviation of the light source emitting light beams in an image recording apparatus according to claim 1, wherein said photodetection means includes a first and a second photodetecting portion being disposed in positions at both sides in a main scanning direction of said photosensitive member and for detecting said detective light beams emitted from detective light emitting portions through said optical system.

8. An apparatus for correcting positional deviation of the light source emitting light beams in an image recording apparatus according to claim 7, wherein said first and second photodetection portions each include a plurality of divisions photodetecting devices.

9. An apparatus for correcting positional deviation of the light source emitting light beams in an image recording apparatus according to claim 7, wherein said first and second photodetection portions each include four divisions photodetecting devices divided by straight lines extending in the main scanning direction and a sub-scanning direction.

10. An apparatus for correcting positional deviation of the light source emitting light beams in an image recording apparatus according to claim 9, wherein said four photodetecting devices output detection signals detecting a shift of said light beam source parallel to X-axis, a rotation of said light beam source round Y-axis, a shift of said light beam source parallel to Z-axis, and a rotation of said light beam source round X-axis, where an optical axis, the main scanning direction, and the sub-scanning direction are aligned with X-axis, Y-axis, and Z-axis of a three-dimensional coordinate system, respectively.

11. An apparatus for correcting positional deviation of the light source emitting light beams in an image recording apparatus according to claim 7, wherein said first and second photodetection portions each include a plurality of photodetection portions disposed in a sub-scanning direction.

12. An apparatus for correcting positional deviation of the light source emitting light beams in an image recording apparatus according to claim 11, wherein at least one of said plurality of photodetection portions is formed of a laterally divided photodetection portion including two photodetecting devices divided by a straight line extending in the main scanning direction.

13. An apparatus for correcting positional deviation of the light source emitting light beams in an image recording apparatus according to claim 12, wherein said laterally divided photodetection portions are disposed diagonally across said photosensitive member and output detection signals detecting a shift of said light beam source parallel to Z-axis and a rotation of said light beam source round X-axis.

14. An apparatus for correcting positional deviation of the light source emitting light beams in an image recording apparatus according to claim 11, wherein at least one of said plurality of photodetection portions is formed of a longitudinally divided photodetection portion including two photodetecting devices divided by a straight line extending in the sub-scanning direction.

15. An apparatus for correcting positional deviation of the light source emitting light beams in an image recording apparatus according to claim 14, wherein said longitudinally divided photodetection portions are disposed at positions on a same level across said photosensitive member and output detection signals detecting a shift of said light beam source parallel to Y-axis and a rotation of said light beam round Z-axis.

16. An apparatus for correcting positional deviation of the light source emitting light beams in an image recording apparatus according to claim 14, wherein said longitudinally divided photodetection portions are disposed diagonally across said photosensitive member and output detection signals detecting a shift of said light beam source parallel to X-axis and a rotation of said light beam source round Y-axis.

17. An apparatus for correcting positional deviation of the light source emitting light beams in an image recording apparatus according to claim 1, wherein said photodetection means detects a portion of said plurality of light beams as said detective light beams.

18. An apparatus for correcting positional deviation of the light source emitting light beams in an image recording apparatus according to claim 1, wherein said photodetection means detects the light beams that are reflected from said photosensitive member of said plurality of light beams.

* * * * *